US008868524B2

(12) United States Patent
Letkeman (10) Patent No.: US 8,868,524 B2
(45) Date of Patent: Oct. 21, 2014

(54) FLOATING MERGE SELECTION VIEWER (75) Inventor: Kimberly D. Letkeman, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1403 days.

(21) Appl. No.: 11/213,148

(22) Filed: Aug. 25, 2005

(65) Prior Publication Data

US 2007/0061702 A1 Mar. 15, 2007

(51) Int. Cl.
G06F 17/30 (2006.01)
G06F 9/44 (2006.01)

(52) U.S. Cl.
CPC .................................. G06F 8/71 (2013.01)
USPC ........................................................ 707/695

(58) Field of Classification Search
USPC ............................................. 707/7, 203, 695
See application file for complete search history.

(56) References Cited

U.S. PATENT DOCUMENTS

| 4,912,637 | A | | 3/1990 | Sheedy et al. | |
|---|---|---|---|---|---|
| 5,649,200 | A | * | 7/1997 | Leblang et al. | 717/122 |
| 5,806,078 | A | * | 9/1998 | Hug et al. | 715/511 |
| 5,828,885 | A | | 10/1998 | Raman | |
| 5,893,119 | A | | 4/1999 | Squibb | |
| 6,216,140 | B1 | | 4/2001 | Kramer | |
| 6,226,652 | B1 | | 5/2001 | Percival et al. | |
| 6,275,223 | B1 | * | 8/2001 | Hughes | 715/751 |
| 6,415,299 | B1 | | 7/2002 | Baisley et al. | |
| 7,131,112 | B1 | * | 10/2006 | Bartz et al. | 717/122 |
| 7,590,933 | B2 | | 9/2009 | Letkeman et al. | |
| 8,386,919 | B2 | | 2/2013 | Letkeman et al. | |
| 2003/0084424 | A1 | | 5/2003 | Reddy et al. | |
| 2004/0177343 | A1 | * | 9/2004 | McVoy et al. | 717/122 |
| 2005/0027757 | A1 | * | 2/2005 | Kiessig et al. | 707/204 |
| 2005/0268281 | A1 | | 12/2005 | Letkeman et al. | |
| 2006/0107220 | A1 | | 5/2006 | Letkeman et al. | |
| 2009/0259933 | A1 | | 10/2009 | Letkeman et al. | |

FOREIGN PATENT DOCUMENTS

JP 11154108 A 4/1999

OTHER PUBLICATIONS

Technique for Merging Component Databases, IBM Technical Disclosure Bulletin, pp. 469-472, Jan. 1995.
U.S. Appl. No. 10/852,791, Non-Final Office Action, Mar. 24, 2008, 7 pg.
U.S. Appl. No. 10/852,791, Non-Final Office Action, Oct. 27, 2008, 5 pg.
U.S. Appl. No. 10/852,791, Notice of Allowance, May 19, 2009, 7 pg.

(Continued)

Primary Examiner — Shiow-Jy Fan
(74) Attorney, Agent, or Firm — Cuenot, Forsythe & Kim, LLC (57) ABSTRACT A method of merging different versions of a file within a software development system can include, within a first window, presenting a graphic object which indicates a difference between a base version of the file and at least one contributor version of the file. Responsive to a pointing device being located within a defined area surrounding the graphic object, the method can include displaying a floating window having a first section and at least a second section. The first section can include a portion of the base version and the second section can include a portion of the at least one contributor version, wherein the first and second sections of the floating window are selectable. The method also can include receiving a selection of one of the sections of the floating window and accepting the base version or the at least one contributor version according to the selection.

20 Claims, 5 Drawing Sheets (56) References Cited

OTHER PUBLICATIONS

U.S. Appl. No. 10/990,906, Non-Final Office Action, Dec. 10, 2007, 9 pg.
U.S. Appl. No. 10/990,906, Final Office Action, Jun. 12, 2008, 13 pg.
U.S. Appl. No. 10/990,906, Non-Final Office Action, Nov. 28, 2008, 5 pg.
U.S. Appl. No. 10/990,906, Notice of Allowance, Apr. 13, 2009, 4 pg.
U.S. Appl. No. 12/489,683, Non-Final Office Action, May 8, 2012, 5 pg.
U.S. Appl. No. 12/489,683, Notice of Allowance, Oct. 24, 2012, 3 pg.

* cited by examiner

FLOATING MERGE SELECTION VIEWER

BACKGROUND

1. Field of the Invention

The present invention relates to software development and, more particularly, to software development tools.

2. Description of the Related Art

Modern software is complex in nature and typically is formed of a collection of many different files. Because the size and complexity of the files themselves can be significant, it is common practice to assign responsibility for developing and maintaining each file to a team of developers. When two developers make changes to a same file in parallel, however, it becomes necessary to combine the contributions of each individual and/or team into a single file that is to be incorporated into a software build.

Software development tools such as configuration management systems or source code control systems are used to track and manage the different file versions created for a given software build. Such systems are capable of combining, or merging, the contributions of different individuals or teams into a resulting file called a merge file. Generally, the source code control system automatically compares two or more different versions of a file, whether source code files, modeling language files, or other electronic documents. Any differences between the compared files are identified by the tool and a merge operation is performed.

Merging unstructured text files is a relatively simple operation since text files have no relationship from one line to the next. In contrast, merging source code files can be much more difficult since line to line changes may affect the integrity of structured units within the file such as methods and the like. The more structured the content of the file versions to be merged, the more difficult the merge operation becomes due to complex internal multi-line structures and relationships which must be preserved.

Current merge user interfaces typically have multiple windows for displaying the various file versions to be merged. One window, for example, may be dedicated to displaying the base file, also referred to as the ancestor. Other windows are used to display contributor versions of the file, which are modified versions of the base file. Each contributor version usually is accompanied by a base window showing the original base file and a merge window for displaying the resulting merge between the base version of the file and a contributor version of the file. Some merge user interfaces make the base and the merged file windows optional or leave the two windows out entirely. Each solution is a compromise in usability designed to reduce merge user interface clutter and to reduce the time needed to render file content to the display screen.

The time required for rendering a file to the screen and the ensuing screen clutter are especially problematic when dealing with structured data that is viewed either hierarchically or diagrammatically. Such is the case as trees and diagrams can require a significant amount of time to render visually and further require a large amount of screen area to be displayed. Considering that many merge operations have more than 2 contributors, with each contributor having a tree or diagram view, one can see that the time needed for graphically rendering the material to the screen requires an unacceptable amount of time, particularly for an expert user that is already familiar with the data being rendered.

Figure 1:
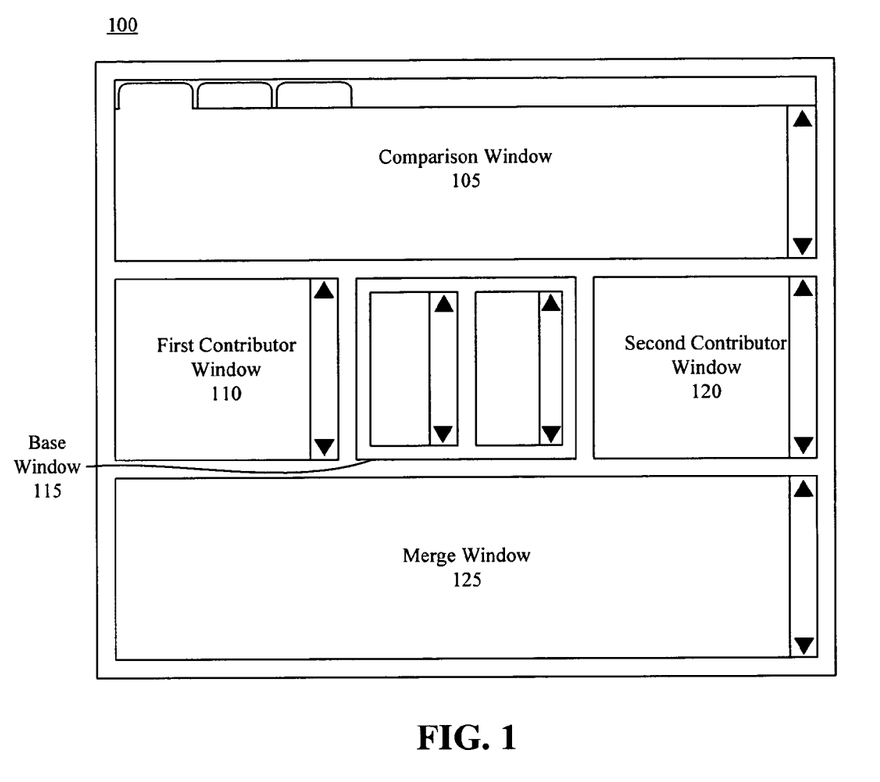
FIG. 1 is a view of a conventional source code control system user interface.

FIG. 1 is a view of a conventional source code control system graphical user interface (GUI) 100. As shown, GUI 100 includes multiple windows, which add to the overall clutter and complexity of the GUI 100. In particular, the user interface 100 includes a comparison window 105, a first contributor window 110, a base window 115, a second contributor window 120, and a merge window 125. The base window 115 is used to display the original file prior to any changes. As shown, the base window 115 typically includes a split view. The split view accommodates the need to for displaying conflicting deltas, which may not be on the same ancestor element. Though the split window is shown as being vertical, it should be appreciated that such a split window view also can be implemented as a horizontal split window view.

The first contributor window 110 displays a modified version of the base file after editing by the first contributor. The second contributor window 120 displays a modified version of the base file after editing by the second contributor. The comparison window 105 displays information relating to conflicts and differences between the base file depicted in the base window 115 and the first contributor window 110 and the second contributor window 120. Often, the comparison window has three tabs corresponding to views which separate left and right differences and conflicts. The tabbed viewing ability is needed due to the split between left and right viewers. The merge window 125 presents the resulting merge file after incorporating changes from both the first and second contributor versions of the file.

It should be appreciated that each window of GUI 100 usually displays an entire version of the subject file. For example, the first contributor window 110 typically displays the entire version of the file from the first contributor. Scroll controls are provided allowing the developer to navigate throughout the file. Likewise, second contributor window 120 displays the entire version of the file from the second contributor. The merge window 125 presents the entire merge file. As noted, since the size of each version of the subject file can be very large, the time needed to render each file version to the display can be lengthy. The screen real estate needed also is large.

It would be beneficial to provide an interface which can be used for merging files which overcomes the limitations described above.

SUMMARY OF THE INVENTION

The present invention provides a method of merging different versions of a file. One embodiment of the present invention can include a method of merging different versions of a file within a software development system. The method can include, within a first window, presenting at least one icon, wherein each icon is associated with one difference between a portion of code of a base version of the file and a portion of code of at least one contributor version of the file. The method further can include, receiving a user selection of an icon of the at least one icon and responsive to the user selection of the icon, displaying a floating window having a first section and at least a second section. The first section can include the portion of code of the base version of the file and the second section can include the portion of code of the at least one contributor version of the file, wherein the first and second sections of the floating window are selectable. The method also can include, receiving a user selection of one of the sections of the floating window and responsive to the user selection of one of the sections of the floating window, including the portion of code of the version of the file of the selected section within a merge file in lieu of the portion of code of the version of the file not selected.

Another embodiment of the present invention can include a computer executing programmatic code for merging different versions of a file within a software development system.

The computer can display a first window presenting at least one icon, wherein each icon is associated with one difference between a portion of code of a base version of the file and a portion of code of at least one contributor version of the file, and which receives a user selection of an icon of the at least one icon. The computer further can display a floating window which includes a first section consisting of a portion of code of the base version of the file and at least a second section consisting of a portion of code of the at least one contributor version of the file. The first section and second section(s) of the floating window can be selectable. Further, the floating window can be displayed responsive to a user selection of an icon, and receives a user selection of one of the sections of the floating window.

Another embodiment of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a solution for merging different versions of a file. In accordance with the inventive arrangements disclosed herein, a user interface is described which can be used in conjunction with a software development tool such as a software merge tool and/or function. The present invention provides a floating merge selection (FMS) window or viewer having a plurality of selectable sections. Each section of the FMS window can correspond to a particular version of a file, particularly as it relates to the addition, deletion, modification, location, or change in some other attribute of a software construct located therein.

Rather than using a series of different windows with each window displaying changes to an entire version of the file, the various sections of the floating merge window display limited amounts of information. Each section displays sufficient contextual information relating to a change in software construct so that a developer can resolve a delta, whether it be an add, delete, change, move, or reorder delta relating to the changed software construct. Directly through the FMS window, a developer can select a particular version of the file and, correspondingly, a particular version of the changed software construct, to be used in the resulting merge file. The inventive arrangements alleviate the need for multiple windows, i.e. one window for each contributor file version and base version, which display the entirety of the particular version of the file to which the window is dedicated.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 2:
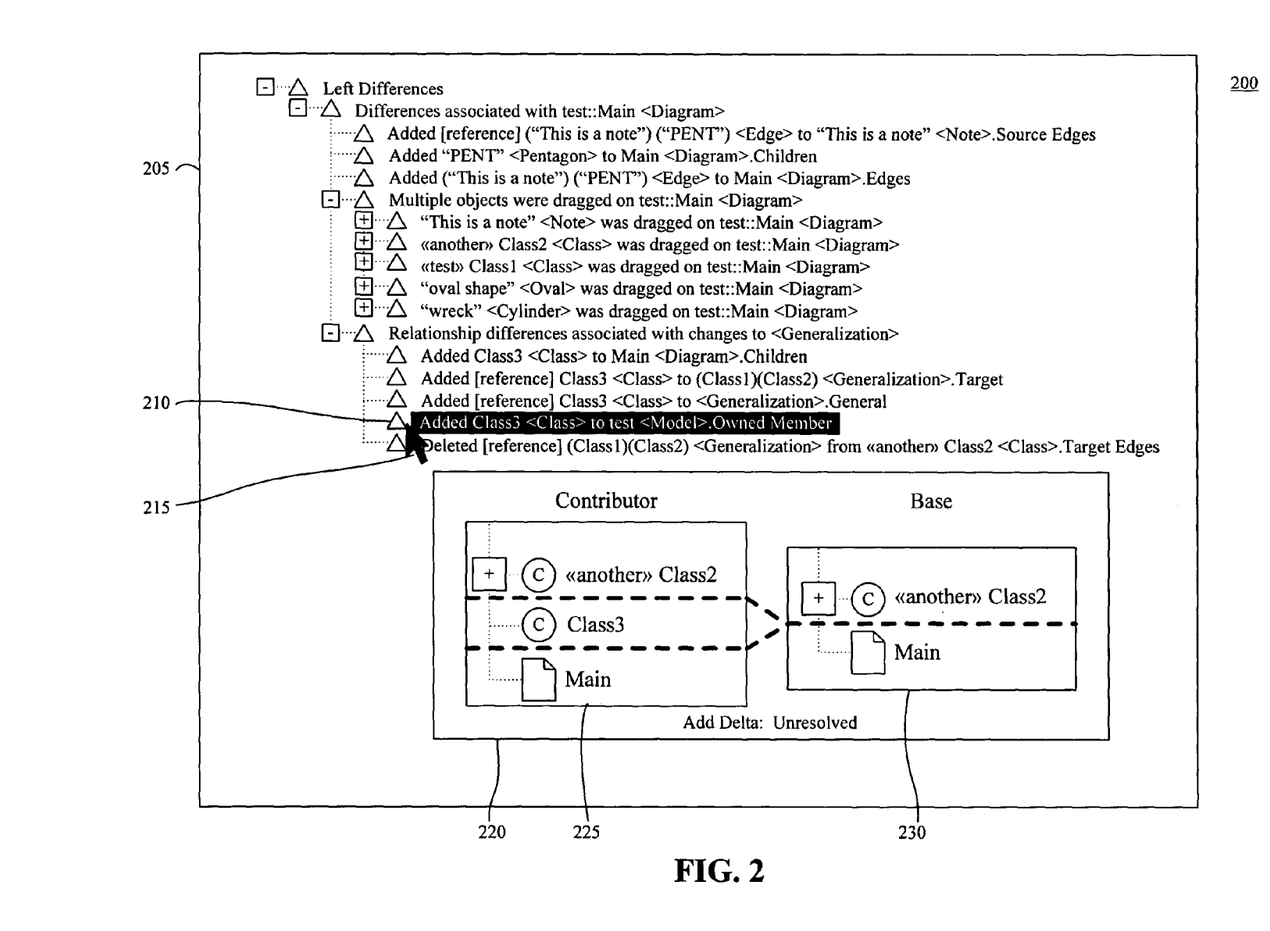
FIG. 2 is a view of a graphical user interface (GUI) for use with a software development system in accordance with one embodiment of the present invention.

FIG. 2 is a view of a graphical user interface (GUI) 200 in accordance with one embodiment of the present invention. GUI 200 can be used in conjunction with a version control system or configuration management system commonly used for software development. The present invention can be used with any system capable of tracking and/or merging different versions of structured files. As used herein, a structured file can include, but is not limited to, a source code file, a diagram, Extensible Markup Language (XML) formatted data, or the like.

As shown, GUI 200 includes a window 205. Window 205 presents a difference view which effectively summarizes the differences and/or changes between a base version of a file and at least one contributor version of the file. As used herein, the base, or ancestor, version of a file is considered to be the baseline file version from which changes are implemented. In other words, the base version of the file can be the last accepted or official version of a file which serves as the starting point from which the contributor versions of the file are made. Rather than presenting a window for each different version of the file to be merged, window 205 presents a summary of the various deltas, or differences, between the versions of the file to be merged.

Graphic object 210 represents a delta that is determined from a comparison of the base version of the file with at least one contributor version of the file to be merged. In this case, graphic object 210 represents an add delta in that the software construct "Class3", which is not included in the base version, has been added to the contributor version of the file. A software construct, as used herein, can include, but is not limited to, a data structure used for a particular purpose. A software construct can refer to a single programming language statement or a collection of more than one statement such as a loop, method, function, or the like, where the collection has a particular function. A software construct further can be defined by an organization such as the Institute of Electrical and Electronics Engineers (IEEE) and the American National Standards Institute (ANSI). These organizations set forth standards for different computer-based programming, scripting, and/or modeling languages such as C, C++, and the like.

When pointer 215 is positioned proximate to graphic object 210, an FMS window 220 is presented. The pointer 215 can be considered to be proximate to graphic object 210 when positioned directly above graphic object 210 or when located within a predefined area encompassing and surrounding graphic object 210. In any case, FMS window 220 can be presented in similar fashion to a pop-up style window which also can be referred to as a tool tip style window or bubble. For example, FMS window 220 can remain visible for approximately one second after the pointer is moved away from the graphic object. This allows a developer time to move the pointer over FMS window 220.

If the pointer is moved over FMS window 220, the window can remain open until the pointer is moved off of the FMS window 220.

FMS window 220 provides a developer with an opportunity to resolve the add delta represented by graphic object 210. As shown, FMS window 220 includes sections 225 and 230, each of which can be selected to resolve the add delta. Section 230, which is labeled "Base", corresponds to the ancestor, or base, version of the file to be merged. Section 225, which is labeled "Contributor", corresponds to the contributor version of the file, i.e. the version which has been modified in some fashion from the base version of the file.

FMS window 220 illustrates the particular change that has been implemented by the contributor as compared to the base version of the file. In particular, section 225 indicates that software construct "Class3" has been introduced into the contributor version of the file. Section 225 further indicates the location at which the software construct "Class3" has been placed within the contributor version of the file. Section 230 indicates where the added software construct "Class3" would be introduced into the base version were the contributor to be selected by the developer as the resolution to the add delta.

In one embodiment, in order to conserve viewing space and resources needed to render the different windows, limited portions of the contributor and base versions of the file are shown in each of sections 225 and 230 respectively. For example, the amount of information presented in each window can be limited to that which is necessary to indicate context so that a developer can choose a resolution to the add delta. In this case, the modules or software constructs above and below, i.e. immediately surrounding, the added software construct "Class3" are depicted.

Figure 3:
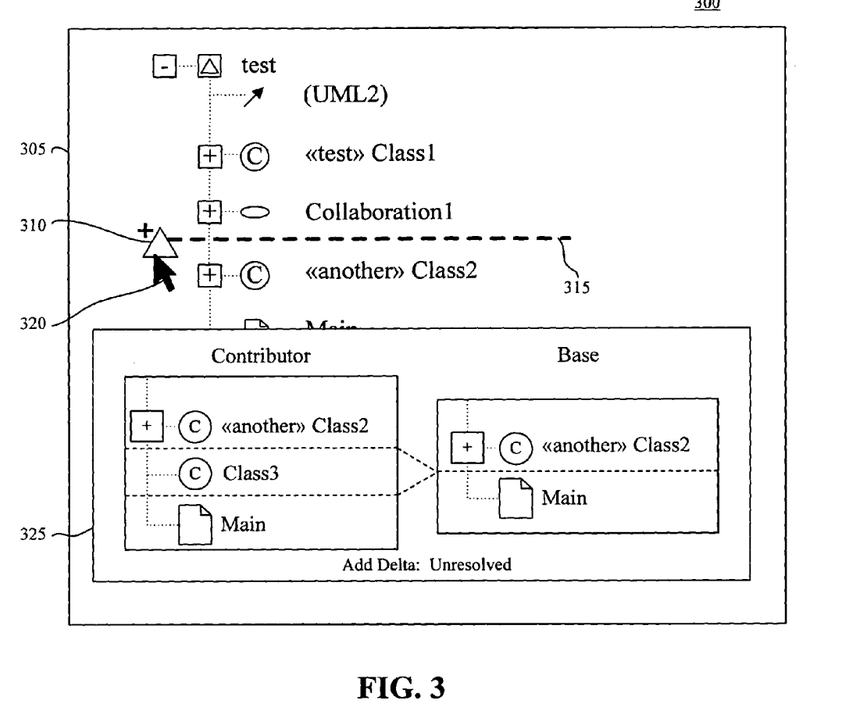
FIG. 3 is a view of a GUI for use with a software development system in accordance with another embodiment of the present invention.

FIG. 3 is a view of a GUI 300 for use with a software development system in accordance with another embodiment of the present invention. In this embodiment, the primary window 305, similar to window 205 of FIG. 2, displays a difference view which indicates deltas between a base version of a file and at least one contributor version of the file with which the base version is to be merged. As shown, the graphic object 310 indicates that if the base version of the file is merged with a contributor version of the file, a software construct will be added at the location within the base version of the file indicated by dotted line 315. As was the case with the GUI of FIG. 2, when pointer 320 is placed proximate to the graphic object 310, an FMS window 325 is displayed. The FMS window 325 provides the information necessary for a developer to select a particular version of the file to be used in the merge operation which resolves the add delta relative to the software construct "Class3".

Figure 4:
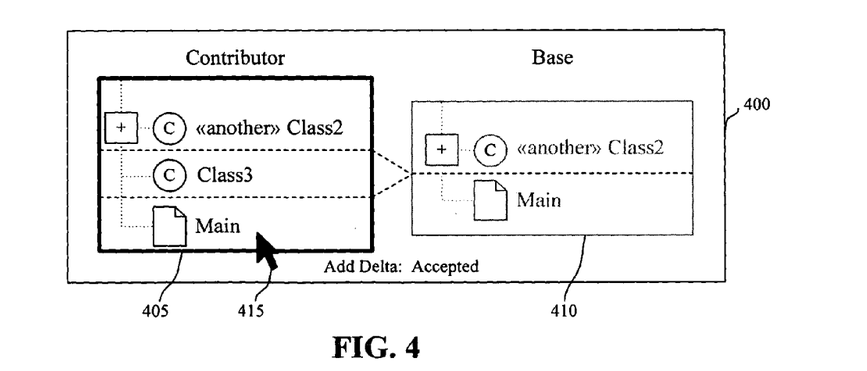
FIG. 4 is a view of a floating merge selection (FMS) window in accordance with another embodiment of the present invention.

FIG. 4 is a view of an FMS window 400 in accordance with another embodiment of the present invention. As noted, each section 405 and 410 of FMS window 400 can be selected using a pointer, keyboard inputs, or some other manner of user input. In this case, by moving pointer 415 over section 405, section 405 can be highlighted or otherwise visually differentiated from section 410. Similarly, or alternatively, section 410 can be grayed out, dimmed, or otherwise visually distinguished from section 405. By clicking or selecting section 405 with pointer 415, the contributor version of the file can be used, thereby causing the addition of the software construct known as "Class3" to be included or added to the base version of the file. Thus, the software construct "Class3" will be added to the merge file.

Figure 5:
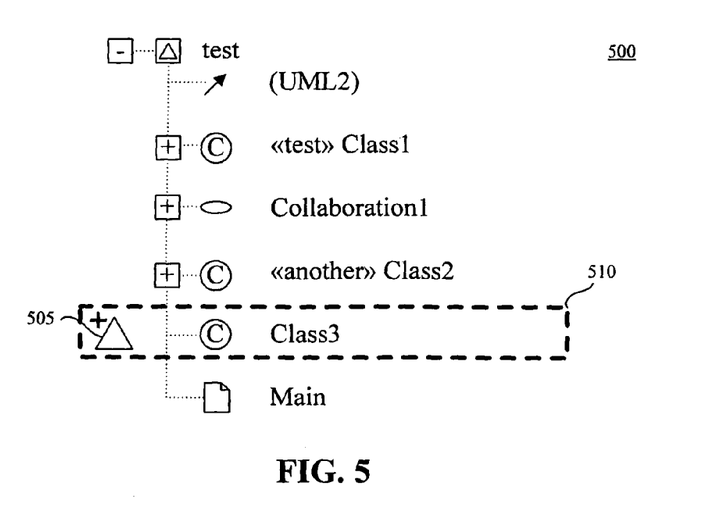
FIG. 5 is a view of a GUI for use with a software development system in accordance with another embodiment of the present invention.

FIG. 5 is a view of a GUI 500 for use with a software development system in accordance with another embodiment of the present invention. GUI 500 is a window which can be used to present deltas as determined from a comparison of the base version of the file and the contributor version of the file after the two versions have been merged. Graphic object 505 indicates the particular software construct that has been added to the base version of the file. Thus, the software construct "Class3" has been added. The change is further indicated by outline 510.

Figure 6:
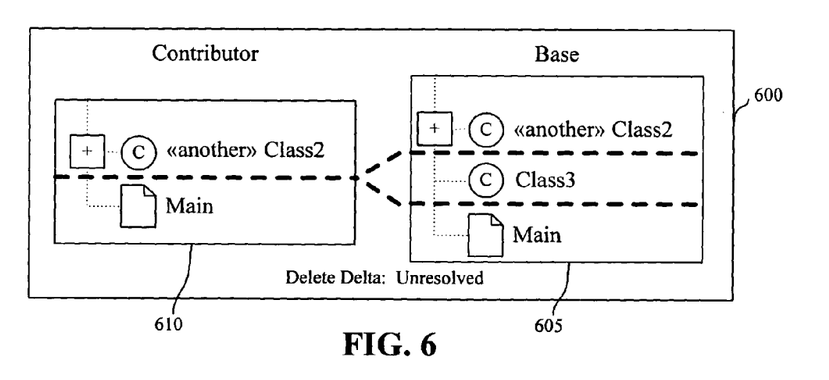
FIG. 6 is a view of an FMS window in accordance with another embodiment of the present invention.

FIG. 6 is a view of an FMS window 600 in accordance with another embodiment of the present invention. FMS window 600 illustrates a delete delta in which a software construct, in this case "Class3", is present within the base version of the file, as shown in the base section 605 of the FMS window 600. The software construct "Class3" has been deleted from the contributor version of the file as shown in section 610. As noted, the FMS window 600 can be presented responsive to placing a pointer above or proximate to, a graphic object within another window. The developer then can select either section 605 or section 610 to resolve the delete delta. More particularly, the developer can select a particular version of the file, i.e. either the base or the contributor as it relates to the software construct "Class3", which is the subject of the delete delta to be used in the merge operation.

Figure 7:
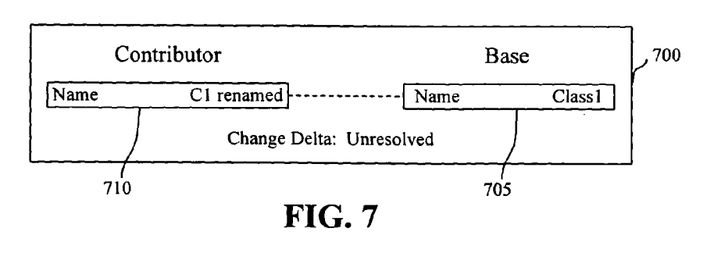
FIG. 7 is a view of an FMS window in accordance with another embodiment of the present invention.

FIG. 7 is a view of an FMS window 700 in accordance with another embodiment of the present invention. FMS window 700 illustrates a case in which a change delta is represented in a primary window. In particular, the software object "Class1" has been renamed from "Class1" in the base version of the file to "C1 renamed" in the contributor version of the file. Responsive to placing a pointer proximate to a graphic object representing the change object, FMS window 700 can be displayed. As with the other examples discussed herein, a developer can select either section 705 or section 710 of FMS window 700. Selection of section 705 will cause the software construct as represented in the base version of the file to be used in the merged file. Selection of section 710 will cause the software construct as represented in the contributor version of the file to be used in the resulting merge file.

Figure 8:
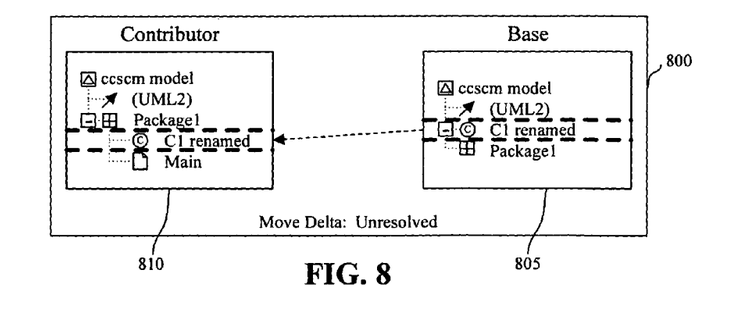
FIG. 8 is a view of an FMS window in accordance with another embodiment of the present invention.

FIG. 8 is a view of an FMS window 800 in accordance with another embodiment of the present invention. FMS window 800 illustrates the case of a move delta indicating that a software construct has been moved to a different location. As shown, software construct "C1" is initially located beneath software construct "UML2" in the base version of the file as indicated by section 805 and, as such, is a child of software construct "ccscm model". Within the contributor version of the file, software construct "C1" has been moved so that it is a direct child of software construct "Package1". Accordingly, in addition to moving the software constructs as shown, the hierarchical level of the software construct "C1" also has been changed to one level deeper within the contributor version of the file as shown in section 810 as compared to the base version of the file as shown in section 805.

Figure 9:
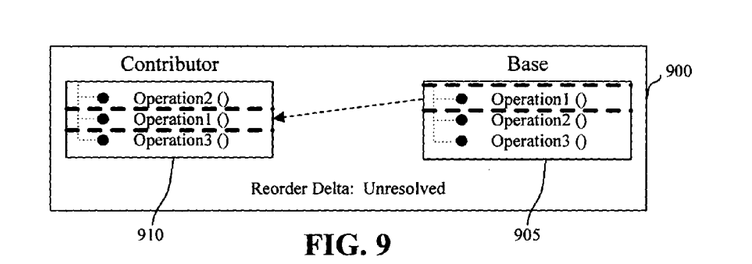
FIG. 9 is a view of an FMS window in accordance with another embodiment of the present invention.

FIG. 9 is a view of an FMS window 900 in accordance with another embodiment of the present invention. FMS window 900 illustrates an example of a reorder conflict in which only the order, but not the hierarchical level, of the software construct has changed. That is, the parents of the software construct have not changed. Section 905 illustrates the original ordering of software objects in the base version of the file while section 910 illustrates the ordering of software objects in the contributor version of the file. A developer can select the desired ordering of software constructs by selecting either section 905 or section 910, such that the merged file will include the ordering of software constructs specified by the selected section.

Figure 10:
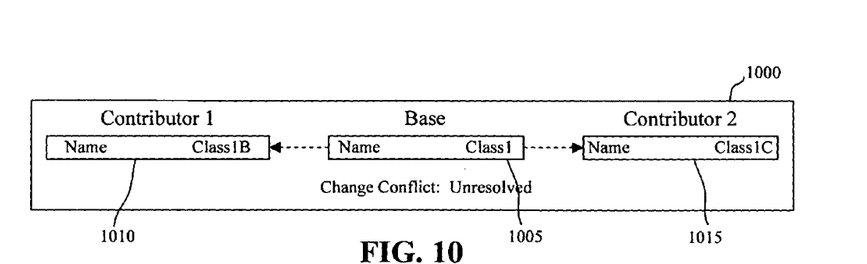
FIG. 10 is a view of an FMS window in accordance with another embodiment of the present invention.

FIG. 10 is a view of an FMS window 1000 in accordance with another embodiment of the present invention. FMS window 1000 illustrates an example of a change conflict. Whereas a delta refers to a change between the base version of the file and one contributor, a conflict refers to the condition where two deltas—one from each contributor—cannot be accepted together because each is incompatible with the other for some reason. As shown, there are two contributors. Section 1005 illustrates the state of a software construct in the base version of the file. In the base version, the name of the software construct is "Class1". Section 1010 illustrates the state of the software construct in contributor 1. In particular, the name of the software construct has been changed to "Class1B". Section 1015 indicates that the software construct has been named "Class1C" in contributor 2. A developer can select the desired resolution to the change conflict by selecting the appropriate section 1005, 1010, or 1015, to be used in the merge file.

Figure 11:
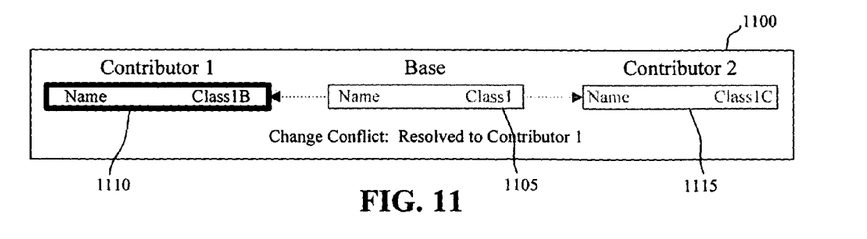
FIG. 11 is a view of an FMS window in accordance with yet another embodiment of the present invention.

FIG. 11 is a view of an FMS window 1100 in accordance with yet another embodiment of the present invention. FMS window 1100 indicates the case in which a user has selected contributor 1, i.e. section 1110, as a resolution to the change conflict of FIG. 10. Accordingly, the software construct as represented by contributor 1 will be used in the resulting merge file. As shown, section 1110 is visually distinguished from sections 1105 and 1115.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, computer software and/or object can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of merging different versions of a file within a software development system, said method comprising:
within a first window, presenting at least one graphic object, wherein each graphic object is associated with one difference between a portion of code of a base version of the file and a portion of code of at least one contributor version of the file;
receiving a user selection of the at least one graphic object;
responsive to the user selection of the graphic object, displaying a floating window having a first section and at least a second section, wherein the first section consists of the portion of code of the base version of the file and the second section consists of the portion of code of the at least one contributor version of the file, wherein the first and second sections of the floating window are selectable;
receiving a user selection of one of the sections of the floating window; and
responsive to the user selection of one of the sections of the floating window, including the portion of code of the version of the file of the selected section within a merge file in lieu of the portion of code of the version of the file not selected.

2. The method of claim 1, wherein the graphic object indicates a conflict between the portion of code of the base version of the file and a portion of code from each of a plurality of contributor versions of the file, said displaying step further comprising presenting the floating window, wherein the floating window comprises at least one section for each of the plurality of contributor versions, wherein each respective section of the floating window is selectable and consists of the portion of code of the version of the file corresponding to that section.

3. The method of claim 1, wherein the difference is an add delta and the second section of the floating window indicates a software object to be added to the base version of the file.

4. The method of claim 1, wherein the difference is a delete delta and the second section of the floating window indicates a software object to be deleted from the base version of the file.

5. The method of claim 1, wherein the difference is a change delta and the second section of the floating window indicates a change to be made to a software object of the base version of the file.

6. The method of claim 1, wherein the difference is a move delta and the second section of the floating window indicates a software object to be moved within the base version of the file.

7. The method of claim 1, wherein the difference is a reorder delta and the second section of the floating window indicates a target location within the base version of the file to which a software object is to be relocated.

8. The method of claim 1, further comprising displaying, within the first and second sections of the floating window, contextual information which indicates a location of the difference between the portion of code of the base version of the file and the portion of code of the at least one contributor version of the file, wherein the contextual information comprises at least one of either a predetermined number of lines of code preceding the portion of code of each version of the file and a predetermined number of lines of code subsequent to the portion of code of each version of the file.

9. A computer system configured to execute programmatic code for merging different versions of a file within a software development system, the computer system including:
a processor; and
a display unit,
wherein said processor is configured to generate:
a first window presenting at least one graphic object, wherein each graphic object is associated with one difference between a portion of code of a base version of the file and a portion of code of at least one contributor version of the file, and which receives a user selection of an graphic object of the at least one graphic object; and
a floating window which includes a first section consisting of a portion of code of the base version of the file and a least a second section consisting of the portion of code of the at least one contributor version of the file, wherein the first section and the at least a second section of said floating window are selectable, and wherein said floating window is displayed responsive to a user selection of the graphic object, and which receives a user selection of one of the sections of the floating window.

10. The computer system of claim 9, wherein, responsive to a selection of one of the sections of said floating window, the base version or the at least one contributor version is accepted according to the selection.

11. The computer system of claim 9, wherein the graphic object indicates a conflict between the base version of the file and a plurality of contributor versions of the file, said displaying further comprising presenting the floating window, wherein the floating window comprises at least one section for each of the plurality of contributor versions, wherein each section of the floating window is selectable and comprises a portion of a version of the file.

12. The computer system of claim 9, wherein the first section and the second section of said floating window display contextual information indicating a location of the difference between the base version and the at least one contributor version of the file.

13. A machine readable storage, wherein the machine readable storage is not a transitory, propagating signal per se, having stored thereon a computer program having a plurality of code sections executable by a machine for causing the machine to perform the steps of:
within a first window, presenting at least one graphic object, wherein each graphic object is associated with one difference between a portion of code of a base version of the file and a portion of code of at least one contributor version of the file;
receiving a user selection of a graphic object of the at least one graphic object;
responsive to the user selection of the graphic object, displaying a floating window having a first section and at least a second section, wherein the first section consists of the portion of code of the base version of the file and the second section consists of the portion of code of the at least one contributor version of the file, wherein the first and second sections of the floating window are selectable;
receiving a user selection of one of the sections of the floating window; and
responsive to the user selection of one of the sections of the floating window, including the portion of code of the version of the file of the selected section within a merge file in lieu of the portion of code of the version of the file not selected.

14. The machine readable storage of claim 13, wherein the graphic object indicates a conflict between the portion of code of the base version of the file and a portion of code from each of a plurality of contributor versions of the file, said displaying step further comprising presenting the floating window, wherein the floating window comprises at least one section for each of the plurality of contributor versions, wherein each respective section of the floating window is selectable and consists of the portion of code of the version of the file corresponding to that section.

15. The machine readable storage of claim 13, wherein the difference is an add delta and the second section of the floating window indicates a software object to be added to the base version of the file.

16. The machine readable storage of claim 13, wherein the difference is a delete delta and the second section of the floating window indicates a software object to be deleted from the base version of the file.

17. The machine readable storage of claim 13, wherein the difference is a change delta and the second section of the floating window indicates a change to be made to a software object of the base version of the file.

18. The machine readable storage of claim 13, wherein the difference is a move delta and the second section of the floating window indicates a software object to be moved within the base version of the file.

19. The machine readable storage of claim 13, wherein the difference is a reorder delta and the second section of the floating window indicates a target location within the base version of the file to which a software object is to be relocated.

20. The machine readable storage of claim 13, further comprising displaying, within the first and second sections of the floating window, contextual information which indicates a location of the difference between the portion of code of the base version of the file and the portion of code of the at least one contributor version of the file, wherein the contextual information comprises at least one of either a predetermined number of lines of code preceding the portion of code of each version of the file or a predetermined number of lines of code subsequent to the portion of code of each version of the file.

* * * * *